United States Patent
Takeshima et al.

(10) Patent No.: US 6,956,008 B2
(45) Date of Patent: Oct. 18, 2005

(54) STORAGE-REDUCTION TYPE $NO_X$ PURIFYING CATALYST

(75) Inventors: Shinichi Takeshima, Mishima (JP); Kohei Yoshida, Susono (JP); Yasuaki Nakano, Sunto-gun (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 78 days.

(21) Appl. No.: 10/436,078

(22) Filed: May 13, 2003

(65) Prior Publication Data

US 2003/0216254 A1 Nov. 20, 2003

(30) Foreign Application Priority Data

May 15, 2002 (JP) ........................ 2002-140576

(51) Int. Cl.[7] ................... B01J 23/00; B01J 23/40; B01J 23/42; B01J 23/58; B01J 23/56
(52) U.S. Cl. ................ 502/326; 502/304; 502/327; 502/328; 502/330; 502/332; 502/333; 502/334; 502/339; 502/349; 502/350; 502/351; 502/355; 502/415; 502/439
(58) Field of Search ............................. 502/304, 326, 502/327, 328, 330, 332–334, 339, 349–351, 355, 415, 439

(56) References Cited

U.S. PATENT DOCUMENTS

| | | | | |
|---|---|---|---|---|
| 5,015,617 A | * | 5/1991 | Ohata et al. | 502/304 |
| 5,837,642 A | * | 11/1998 | Tanaka et al. | 502/304 |
| 5,898,014 A | | 4/1999 | Wu et al. | |
| 5,911,960 A | * | 6/1999 | Miyoshi et al. | 423/213.5 |
| 5,958,827 A | * | 9/1999 | Suda et al. | 502/304 |
| 6,107,240 A | * | 8/2000 | Wu et al. | 502/304 |
| 6,171,572 B1 | * | 1/2001 | Aozasa | 423/594.12 |
| 6,180,075 B1 | | 1/2001 | Lindner et al. | |
| 6,261,989 B1 | * | 7/2001 | Tanaka et al. | 502/217 |
| 6,276,132 B1 | * | 8/2001 | Kanesaka et al. | 60/286 |
| 6,306,794 B1 | * | 10/2001 | Suzuki et al. | 502/304 |
| 6,326,329 B1 | * | 12/2001 | Nunan | 502/242 |
| 6,350,421 B1 | * | 2/2002 | Strehlau et al. | 423/213.2 |
| 6,358,880 B1 | * | 3/2002 | Hedouin et al. | 502/302 |
| 6,413,483 B1 | * | 7/2002 | Brisley et al. | 423/239.1 |
| 6,468,941 B1 | * | 10/2002 | Bortun et al. | 502/300 |
| 6,492,297 B1 | * | 12/2002 | Sung | 502/304 |
| 6,497,848 B1 | * | 12/2002 | Deeba et al. | 422/180 |
| 6,499,294 B1 | * | 12/2002 | Katoh et al. | 60/301 |
| 6,585,944 B1 | * | 7/2003 | Nunan et al. | 423/239.1 |
| 6,585,945 B2 | * | 7/2003 | Wu et al. | 423/239.1 |
| 6,620,762 B2 | * | 9/2003 | Tan et al. | 502/304 |
| 6,682,706 B1 | * | 1/2004 | Tanaka et al. | 422/180 |
| 6,764,665 B2 | * | 7/2004 | Deeba et al. | 423/239.1 |
| 6,777,370 B2 | * | 8/2004 | Chen | 502/241 |

FOREIGN PATENT DOCUMENTS

| | | |
|---|---|---|
| CN | 1206628 A | 2/1999 |
| EP | 0 993 860 A1 | 4/2000 |
| EP | 1 027 919 A | 8/2000 |
| EP | 1 127 603 A1 | 8/2001 |
| EP | 1 166 855 A1 | 1/2002 |
| JP | A 6-279027 | 10/1994 |
| JP | A 10-194742 | 7/1998 |
| JP | A 2001-79355 | 3/2001 |
| JP | A 2001-271634 | 10/2001 |

* cited by examiner

*Primary Examiner*—Cam N. Nguyen
(74) *Attorney, Agent, or Firm*—Oliff & Berridge, PLC

(57) ABSTRACT

A storage-reduction type $NO_x$ purifying catalyst includes a monolith substrate having formed thereon a coat layer containing a cerium-zirconium composite oxide and a cerium-free oxide, a noble metal and an $NO_x$ storing material being supported on the coat layer and the cerium content of the cerium-zirconium composite oxide being less than 30 mol % based on the total molar number of metal atoms contained.

10 Claims, 3 Drawing Sheets

S POISONING RECOVERY CONDITIONS:
A/F=14, 650°C × 10 MIN.

REGENERATION CONDITIONS:
TEMPERATURE-RISING RATE OF 10°C/MIN,
MODEL GAS CORRESPONDING TO A/F=14

STORAGE-REDUCTION TYPE $NO_x$ PURIFYING CATALYST

BACKGROUND OF THE INVENTION

1. Field of the Invention

The present invention relates to an exhaust gas purifying catalyst for purifying an exhaust gas discharged from an internal combustion engine such as automobile engine, more specifically, the present invention relates to a storage-reduction type $NO_x$ purifying catalyst in which the sulfur poisoning of the $NO_x$ storing material is remarkably reduced.

2. Description of the Related Art

The exhaust gas discharged from an internal combustion engine, such as automobile engine, can be purified by a three-way catalyst which promotes burning of carbon monoxide (CO), burning of hydrocarbon (HC) and reduction of nitrogen oxide ($NO_x$).

This three-way catalyst is generally constituted by forming a coat layer of a catalyst support such as γ-alumina on a monolith substrate and loading a catalyst component such as platinum (Pt), palladium (Pd) and rhodium (Rh) on the coat layer.

The three-way catalyst can efficiently perform the above-described purification when the exhaust gas has a composition in a specific range. Therefore, the air-fuel ratio in the internal combustion engine is strictly limited so as to give an exhaust gas composition in a specific narrow range. However, in practice, the exhaust gas composition undergoes a certain degree of fluctuation, due to the time lag in the control system or the like, and sometimes deviates from the specific narrow range.

Here, a cerium-zirconium composite oxide can provide an oxygen storage capacity (OSC) to absorb oxygen in an oxidative atmosphere containing $O_2$ in a relatively large amount and releasing oxygen in a reducing atmosphere containing CO and HC in a relatively large amount, because the Ce atom contained therein can cause a change in the valence number.

Accordingly, when a cerium-zirconium composite oxide is contained in the exhaust gas purifying catalyst, the exhaust gas composition in the vicinity of the catalyst component fluctuates less and the above-described exhaust gas purification can proceed more efficiently.

In addition, considerable heat is generated accompanying the oxygen absorption of the cerium-zirconium composite oxide and this heat can be utilized for warming of the catalyst at engine start-up and can expedite the starting of the catalytic activity. By virtue of these properties, the cerium-zirconium composite oxide is used as a co-catalyst for the exhaust gas purifying catalyst.

As for the related art describing such a cerium-zirconium composite oxide, Japanese Unexamined Patent Publication (Kokai) Nos. 10-194742 and 6-279027 and the like are known. In general, the cerium-zirconium composite oxide as the OSC material is considered to optimally have a cerium content as high as about 50 mol %.

On the other hand, for the purpose of advancing environmental protection, reduction in the generation amount of carbon dioxide ($CO_2$) discharged from an internal combustion engine such as automobile engine and reduction in the generation amount of $NO_x$ are an important issue. In order to attain such reduction, a lean-burn engine has been developed for the purpose of improving the fuel consumption and a storage-reduction type $NO_x$ purifying catalyst obtained by adding a function of storing $NO_x$ in a lean atmosphere to a conventional three-way catalyst has been developed for the purpose of purifying the exhaust gas of the lean-burn engine. These have a certain success against the above-described problem.

In the lean-burn engine, the fuel is usually burned at an air-fuel ratio (A/F) in the lean (oxygen-excess) condition and temporarily and intermittently burned in the rich (fuel-excess) condition.

HC and CO in the exhaust gas are efficiently burned and removed in the lean condition by the action of catalyst in the oxidative atmosphere. On the other hand, $NO_x$ is absorbed by a storing material in the lean condition and this $NO_x$ is temporarily released in the rich condition and reduced and purified by the action of catalyst in the temporary reducing atmosphere.

For the $NO_x$ storing material of the storage-reduction type $NO_x$ purifying catalyst, an alkali metal and/or an alkaline earth metal are generally used. Such an $NO_x$ storing material is considered to change into a nitrate in the lean atmosphere and into a carbonate in the rich atmosphere and thereby perform the absorption and desorption of $NO_x$.

The lean-burn internal combustion engine such as diesel engine is characterized in that the heat efficiency is high and, therefore, the generated amount of $CO_2$ is small. On the other hand, this internal combustion engine is disadvantageous in that $NO_x$ is generated in a relatively large amount and moreover, particulates of harmful substances are generated. Therefore, it is an important problem to reduce both $NO_x$ and particulates.

To solve this problem, the present inventors have proposed, as described in Kokai No. 2001-271634, an exhaust gas purifying system (DPNR) where $NO_x$ and particulate both are simultaneously purified by combining the control of air-fuel ratio in the combustion system with a specific catalyst in the exhaust system.

In this system, a storage-reduction type $NO_x$ purifying catalyst is similarly used as the exhaust gas purifying catalyst and the fuel is usually burned in the lean condition and temporarily and intermittently burned in the rich condition, whereby the particulates are burned and purified using the active oxygen generated from $NO_x$ storing material or the like accompanying the fluctuation in the exhaust gas composition and at the same time, $NO_x$ is reduced and purified.

In use of the storage-reduction type $NO_x$ purifying catalyst, the lean atmosphere and the rich atmosphere must be swiftly changed over by the control of the air-fuel ratio and therefore, depending on the case, the cerium-zirconium composite oxide as the OSC material having an action of absorbing and releasing oxygen is used in a small amount only for the early warming of the catalyst at engine start-up.

However, the fuel for the internal combustion engine contains a trace of sulfur. This sulfur is oxidized in the internal combustion engine and is coverted into $SO_x$ which is an exhaust gas component. When this $SO_x$ comes into contact with the storage-reduction type $NO_x$ purifying catalyst, a part is oxidized even into $SO_3$ by platinum or the like as a catalyst component and the $NO_x$ storing material such as alkali metal and/or alkaline earth metal forms a sulfate.

The sulfate is chemically rather stable, compared to a carbonate and a nitrate and the sulfuric acid radical is not easily desorbed from the $NO_x$ storing material even in the rich atmosphere at high temperature. As a result, the $NO_x$ absorbing and releasing action and/or the active oxygen producing action of the $NO_x$ storing material are inhibited to incur aging reduction in the performance of the storage-reduction type $NO_x$ purifying catalyst.

This reduction in the catalytic performance of the storage-reduction type $NO_x$ purifying catalyst by $SO_x$, namely, sulfur poisoning is one of important problems to be solved in use of the storage-reduction type $NO_x$ purifying catalyst.

SUMMARY OF THE INVENTION

Accordingly, an object of the present invention is to solve the sulfur poisoning of the storage-reduction type $NO_x$ purifying catalyst. More specifically, although a cerium-zirconium composite oxide is used, a cerium-zirconium composite oxide having a composition clearly different from those conventionally used as the OSC material is used by using an action completely different from conventionally known actions.

This object can be attained by a storage-reduction type $NO_x$ purifying catalyst comprising a monolithic substrate having formed thereon a coat layer containing a cerium-zirconium composite oxide and a cerium-free oxide, a noble metal and an $NO_x$ storing material being supported on the coat layer and the cerium content of the cerium-zirconium composite oxide being less than 30 mol % based on the total molar number of metal atoms contained.

In particular, the present invention is a storage-reduction type $NO_x$ purifying catalyst characterized in that a cerium-zirconium composite oxide is applied to a storage-reduction type $NO_x$ purifying catalyst and the cerium-zirconium composite oxide contains cerium in an amount of less than 30 mol %, namely, the cerium-zirconium composite oxide has a cerium content clearly lower than that of the cerium-zirconium composite oxides conventionally used as the OSC material.

DESCRIPTION OF THE PREFERRED EMBODIMENT

The action of the storage-reduction type $NO_x$ purifying catalyst of the present invention is described below.

In the present invention, as described below, the cerium-zirconium composite oxide is considered to inhibit the sulfur poisoning of a storage-reduction type $NO_x$ purifying catalyst by an action completely different from that of conventional OSC materials.

Ceria originally has a property of exhibiting high catalytic activity for the following aqueous gas shift reaction:

$$CO + H_2O \rightarrow H_2 + CO_2 \quad (1)$$

and from CO as a reducing component contained in the reducing exhaust gas in the rich condition, $H_2$ as a reducing component, can likewise be efficiently produced.

$H_2$ can provide a remarkably higher reduction activity than CO and, due to the presence of $H_2$ in a sufficiently large amount in the atmosphere, a sulfuric acid radical can be desorbed from an $NO_x$ storing material (A) which is in the form of a sulfate, according to the following formula:

$$ASO_4 + H_2 + CO_2 \rightarrow ACO_3 + SO_2 + H_2O \quad (2)$$

The cerium-zirconium composite oxide can also show this catalytic activity of ceria in an aqueous gas shift reaction. However, ceria has high reactivity with $SO_x$ and if $SO_x$ is present in the atmosphere, ceria is bonded thereto and loses the above-described catalytic activity. Similarly, the cerium-zirconium composite oxide also loses such catalytic activity if $SO_x$ is present in the atmosphere.

On the other hand, it is found that, as verified later in Examples, when the cerium content of the cerium-zirconium composite oxide is low, the cerium-zirconium composite oxide prevents sulfur poisoning of an $NO_x$ storing material and the exhaust gas purifying performance, which is the purpose of the storage-reduction type $NO_x$ purifying catalyst, is maintained.

The reason therefor is considered to be as follows. When the cerium content of the cerium-zirconium composite oxide is low, in other words, the zirconium content is high, the high reactivity and/or bonding property between ceria and $SO_x$ is inhibited by the high stability of zirconia and ceria is substantially not deprived of its catalytically active surface and, as a result, the high activity for an aqueous gas shift reaction is maintained.

Figure 1:
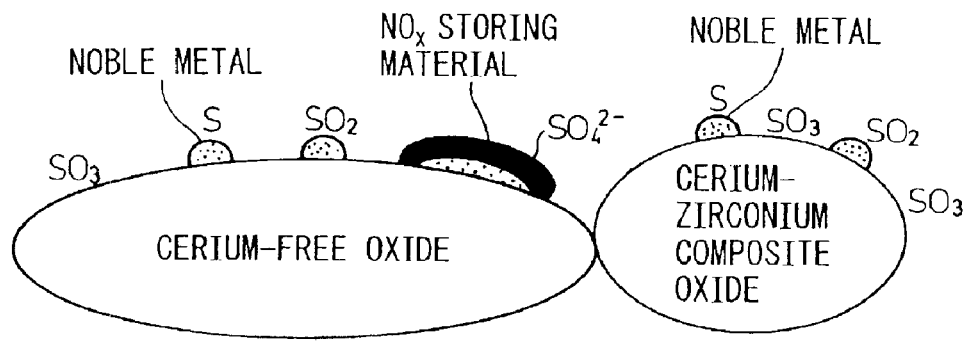
FIG. 1 is a model view showing the state where a storage-reduction type $NO_x$ purifying catalyst is poisoned by sulfur.

FIG. 1 is a model view showing the state where the storage-reduction type $NO_x$ purifying catalyst is sulfur poisoned and, in the exhaust gas atmosphere containing $SO_x$, $SO_2$ or $SO_3$, is bonded or adsorbed to the cerium-zirconium composite oxide and the $NO_x$ storing material is bonded to $SO_4^-$ ion to form a sulfate. Such a state that $SO_2$ or $SO_3$ is bonded or adsorbed to the cerium-zirconium composite oxide appears at a temperature lower than a specific temperature where $SO_2$ or $SO_3$ can be desorbed from the surface or inside of the cerium-zirconium composite oxide.

Here, when the cerium content of the cerium-zirconium composite oxide is low, the bonding or adsorbing property of $SO_2$ or $SO_3$ is decreased and $SO_2$ or $SO_3$ desorbs from the surface of the cerium-zirconium composite oxide even at a relatively low temperature.

When this desorption occurs, the cerium-zirconium composite oxide undertakes a catalytic activity for the aqueous gas shift reaction (1) to provide $H_2$ to the atmosphere and according to the reaction (2), the sulfuric acid radical can be desorbed from the $NO_2$ storing material (A) which is in the form of a sulfate. In other words, when the cerium content of the cerium-zirconium composite oxide is low, the sulfur poisoning of the $NO_x$ storing material can be broken off at a lower temperature and, therefore, the temperature range where the $NO_x$ storing material exerts its original function of adsorbing and releasing $NO_x$ can be enlarged.

On the other hand, the cerium-zirconium composite oxide has, as described above, an oxygen storing capacity and acts to relieve the changeover between the lean atmosphere and the rich atmosphere, which is necessary in the use of the storage-reduction type $NO_x$ purifying catalyst. Nevertheless, when the cerium content of the cerium-zirconium composite oxide is low, the oxygen storing capacity is also low and, therefore, the function of the storage-reduction type $NO_x$ purifying catalyst is not substantially inhibited.

Accordingly, by setting the cerium content of the cerium-zirconium composite oxide low, the cerium-zirconium composite oxide can exert a catalytic action for an aqueous gas shift reaction and, at the same time, the storage-reduction type $NO_x$ purifying catalyst can exert its original function by utilizing the changeover between the lean atmosphere and the rich atmosphere. The cerium content which can bring out both of these functions is less than 30 mol %, preferably from 0.1 to 25 mol %, more preferably from 0.5 to 10 mol %, based on the total molar number of contained metal atoms.

It is also found that when the cerium-zirconium composite oxide further contains at least one metal (M) selected from rare earth metals (excluding cerium), the sulfur poisoning of the storage-reduction type $NO_x$ purifying catalyst can be even more inhibited. The reason therefor is not clearly known, however, it is presumed to occur because, by containing a rare earth metal except for cerium, the cerium atom of the cerium-zirconium composite oxide is stabilized in the trivalent state and the bonding of the cerium atom to an $SO_4^-$ ion is suppressed.

The metal (M) is preferably selected from lanthanum, samarium, neodymium, gadolinium and yttrium and the M/Ce molar ratio is preferably from 0.1 to 10. Furthermore, the cerium-zirconium composite oxide preferably contains from 10 to 30 mol % of (Ce+M) based on the total molar number of metal atoms contained.

In addition, the storage-reduction type $NO_x$ purifying catalyst of the present invention preferably comprises a cerium-zirconium composite oxide and a cerium-free oxide at a ratio, in terms of the mass ratio of cerium-zirconium composite oxide/cerium-free oxide, from 2/8 to 8/2, more preferably from 3/7 to 7/3.

The cerium-free oxide mixed with the cerium-zirconium composite oxide provides a surface where a catalyst component such as platinum and an $NO_x$ storing material are supported. Also, the apparent volume of the cerium-zirconium composite oxide increases and this elevates the contact efficiency between the cerium-zirconium composite oxide and the exhaust gas. Therefore, the cerium-free oxide is considered to contribute to the exhaust gas purifying performance.

The constitution of the storage-reduction type $NO_x$ purifying catalyst of the present invention is described below.

The storage-reduction type $NO_x$ purifying catalyst of the present invention is constituted such that a coat layer containing a cerium-zirconium composite oxide having a cerium content of less than 30 mol % and a cerium-free oxide is formed on a monolithic substrate and a noble metal and an $NO_x$ storing material are supported on the coat layer.

The monolithic substrate is preferably a straight flow-type substrate having a honeycomb shape, such as, cordierite, for the purpose of purifying the exhaust gas of gasoline cars, and is preferably a cordierite-made wall flow-type substrate having a honeycomb shape, where cells are alternately filled, for the purpose of purifying the exhaust gas containing particulate of diesel cars.

Of the supports coated on the monolithic substrate, the cerium-zirconium composite oxide contains cerium in an amount of less than 30 mol %, preferably from 0.1 to 25 mol %, more preferably from 0.5 to 10 mol %, based on the total molar number of contained metal atoms.

The cerium-zirconium composite oxide preferably further contains at least one metal (M) selected from rare earth metals (excluding cerium), the metal (M) is preferably selected from lanthanum, samarium, neodymium, gadolinium and yttrium, the M/Ce molar ratio is preferably from 0.1 to 10, and the cerium-zirconium composite oxide preferably contains from 10 to 30 mol % of (Ce+M) based on the total molar number of metal atoms contained.

Such a cerium-zirconium composite oxide can be produced by various methods. For example, a ceria precursor such as cerium hydroxide $Ce(OH)_3$, cerium nitrate $Ce(NO_3)_3$, cerium chloride $CeCl_3$ and cerium acetate $Ce(CH_3CO_2)_3$, a zirconia precursor such as zirconium hydroxide $Zr(OH)_3$, zirconium oxynitrate $ZrO(NO_3)_2 \cdot 2H_2O$ and zirconium chloride $ZrCl_4$, and if desired, a nitrate of a rare earth metal except for cerium are mixed to prepare a slurry or a solution and after performing an operation such as co-precipitation according to the kind of precursors, the slurry or solution is subjected to drying and baking in an air atmosphere of 500 to 1,000° C., whereby the cerium-zirconium composite oxide can be obtained.

The obtained cerium-zirconium composite oxide is preferably pulverized by milling or the like to particles about 1 µm in diameter.

In such a preparation method, when the raw material ratio is controlled, a cerium-zirconium composite oxide having a cerium/zirconium/rare earth metal molar ratio adjusted to fall within a predetermined range can be easily produced.

Examples of the cerium-free oxide include alumina, silica, titania, zirconia, silica-alumina, titania-zirconia and zirconia-calcia. A cerium-free oxide comprising fine particles having an average particle size of 1 µm or less can be suitably used.

In the storage-reduction type $NO_x$ purifying catalyst of the present invention, a coat layer containing these cerium-zirconium composite oxide and cerium-free oxide is formed and the mass ratio of cerium-zirconium composite oxide/cerium-free oxide is preferably from 2/8 to 8/2, more preferably from 3/7 to 7/3.

The cerium-zirconium composite oxide and the cerium-free oxide are preferably coated to form a coat layer after these oxides are substantially uniformly mixed. The mixing is performed, for example, by subjecting the cerium-zirconium composite oxide and the cerium-free oxide, at a predetermined ratio, to ball mill mixing over a necessary time period, whereby a substantially uniform mixture can be obtained.

Thereafter, a ceramic binder such as alumina sol, silica sol or titania sol is added, water in an amount giving an appropriate slurry viscosity is further added and mixed, and the obtained slurry is wash-coated on a monolith substrate, subjected to drying and baking and, as a result, a coat layer can be formed.

The noble metal supported on the coat layer of the monolith substrate is platinum (Pt), palladium (Pd), rhodium (Rh) or the like. The noble metal can be generally loaded by impregnating a catalyst support structure with a solution of a noble metal compound such as dinitrodiammine platinum $Pt(NH_3)_2(NO_2)_2$, palladium nitrate $Pd(NO_3)_2$ and rhodium nitrate $Rh(NO_3)_3$, and then subjecting the structure to drying and baking.

The $NO_x$ storing material which is further supported on the coat layer of the monolith layer is at least one metal selected from alkali metals of lithium (Li), sodium (Na), potassium (K) and rubidium (Rb), and alkaline earth metals of magnesium (Mg), calcium (Ca), strontium (Sr) and barium (Ba), preferably at least one metal selected from Li, K and Ba.

The $NO_x$ storing material is suitably loaded after the noble metal is loaded, and can be loaded by impregnating a solution of an acetate, a nitrate, or the like, of the above-described alkali metal, or the like, simultaneously with the loading of the noble metal and then subjecting it to drying and baking.

The present invention is described in greater detail below by referring to Example.

EXAMPLE (1) Effect of Cerium Content on $NO_x$ Purification Percentage after $SO_x$ Desorption Treatment Zirconium hydroxide powder was impregnated and mixed with an aqueous cerium nitrate solution by variously changing the amount of the aqueous cerium nitrate solution added and after performing drying of 80° C.×12 hours and baking of 550° C.×2 hours, the obtained powder was milled over 8 hours. In this way, various cerium-zirconium composite oxides having a value of n=0.001 to 0.80 as cerium-zirconium composite oxide $Ce_nZr_{1-n}O_2$ were prepared.

To 100 parts by mass of each cerium-zirconium composite oxide obtained, 100 parts by mass of γ-alumina as a cerium-free oxide, 10 parts by mass of alumina sol and an appropriate amount of ion exchanged water were added and mixed in a ball mill to prepare a slurry containing each cerium-zirconium composite oxide and γ-alumina.

Thereafter, each slurry was wash-coated on a straight flow-type cordierite-made monolith substrate (apparent volume: 50 ml, cell density: about 300 cells/inch$^2$), dried and then subjected to baking of 500° C.×2 hours in an air atmosphere to form a coat layer on the monolith substrate.

Subsequently, this coat layer was impregnated with an aqueous dinitrodiammineplatinum complex solution and an aqueous rhodium nitrate solution and subjected to baking at 500° C. for 2 hours to load Pt and Rh thereon. Furthermore, aqueous solutions of barium acetate, potassium acetate and lithium acetate were impregnated into the coat layer having supported thereon Pt and Rh, then dried and subjected to baking of 500° C. for 1 hour, whereby $NO_x$ storing materials Ba, K and Li were supported.

Here, the amount of each cerium-zirconium composite oxide coated on the monolith substrate was adjusted to give the same total oxygen storage amount by previously measuring the oxygen storage amount at 500° C. per unit mass of each cerium-zirconium composite oxide. The amounts of Pt and Rh supported were 3 g and 0.3 g, respectively, per liter of the monolith substrate and the amounts of $NO_x$ storing materials were 0.2 mol of Ba, 0.1 mol of K and 0.1 mol of Li, per liter of the monolith substrate.

Each catalyst sample of the thus-prepared storage-reduction type $NO_x$ purifying catalyst was measured for $NO_x$ purification percentage after an $SO_x$ desorption treatment. This measurement was performed as follows.

Each catalyst sample was disposed in an exhaust gas purifying performance measuring device and a model exhaust gas (flow rate: 28 L(liter)/min, 400° C.) containing $SO_2$ in a high concentration and having the following composition:

100 ppm $SO_2$+250 ppm NO+0.1% HC+0.1% CO+10% $CO_2$+6% $O_2$+8% $H_2O$ (balance: $N_2$)

was introduced to the catalyst sample over 1 hour to substantially saturate the $NO_x$ storing materials with $SO_x$.

Subsequently, each catalyst sample was subjected to an $SO_x$ desorption treatment of exposing the sample to a rich exhaust gas of A/F=14 at 650° C. for 10 minutes and then, while exposing the sample to an atmosphere where a lean exhaust gas of A/F=20 and a rich exhaust gas of A/F=14 were changed over every 2 minutes, the $NO_x$ purifying performance with a lean exhaust gas at 500° C. was measure. The results obtained are shown in Table 1.

TABLE 1

$NO_x$ Purification Percentage after $SO_x$ Desorption Treatment

| Ce Content (%) | 500° C. $NO_x$ Purification Percentage (%) |
|---|---|
| 80 | 27 |
| 50 | 27 |
| 30 | 35 |
| 25 | 52 |
| 20 | 65 |
| 15 | 67 |
| 10 | 72 |
| 7 | 75 |
| 5 | 72 |
| 3.5 | 65 |
| 1 | 55 |
| 0.1 | 26 |

S Desorption conditions: A/F = 14, 650° C. × 10 min
Measured at 500° C.

It can be seen from the results in Table 1 that the $NO_x$ purification percentage is remarkably improved with a cerium content of less than 30%. As described above, this $NO_x$ purification percentage is a value after the $NO_x$ al, in the state of being substantially saturated with $SO_x$, is subjected to an $SO_x$ desorption treatment. Also, this is a value under the conditions where the oxygen storage amount, namely, the effect on the reduction purification of $NO_x$, is made equal by adjusting the amount of cerium-zirconium composite oxide.

Accordingly, the results in Table 1 prove that the cerium-zirconium composite oxide having a cerium content of less than 30% can provide a storage-reduction type $NO_x$ purifying catalyst exhibiting high sulfur desorption without affecting the reduction purification of $NO_x$.

(2) Effect of Addition of Rare Earth Metal on $NO_x$ Purification Percentage after $SO_x$ Desorption Treatment Zirconium hydroxide powder was impregnated and mixed with an aqueous cerium nitrate solution and an aqueous lanthanum nitrate solution or aqueous yttrium nitrate solution by variously changing the amount of the aqueous lanthanum or yttrium nitrate solution added and after performing drying at 80° C. for 12 hours and baking at 550° C. for 2 hours, the obtained powder was milled for 8 hours.

In this way, cerium-zirconium composite oxides having a cerium content of 7 mol % and further containing La or Y in various amounts were prepared.

To 100 parts by mass of each cerium-zirconium composite oxide obtained, 100 parts by mass of γ-alumina as a cerium-free oxide, 10 parts by mass of alumina sol and an appropriate amount of ion exchanged water were added in the same manner as in (1) above and mixed in a ball mill and using the slurry containing each cerium-zirconium composite oxide and γ-alumina, a coat layer was formed on a monolith substrate.

On this coat layer, Pt and Rh were loaded in the same manner as in (1) above using an aqueous dinitrodiammineplatinum complex solution and an aqueous rhodium nitrate solution and furthermore, Ba, K and Li were loaded using aqueous solutions of barium acetate, potassium acetate and lithium acetate.

Here, the amount of each cerium-zirconium composite oxide coated on the monolith substrate was adjusted in the same manner as in (1) above to give the same total oxygen storage amount. The amounts of Pt and Rh loaded were 3 g and 0.3 g, respectively, per liter of the monolith substrate and the amounts of $NO_x$ storing materials were 0.2 mol of Ba, 0.1 mol of K and 0.1 mol of Li, per liter of the monolith substrate.

Each catalyst sample of the thus-prepared storage-reduction type $NO_x$ purifying catalyst was measured on the $NO_x$ purification percentage after an $SO_x$ desorption treatment in the same manner as in (1) above. The results obtained are shown in Table 2.

TABLE 2

$NO_x$ Purification Percentage after $SO_x$ Desorption Treatment

|  | (Ce + Rare Earth Metal) Content (mol %) | Rare Earth Metal Content (mol %) | $NO_x$ Purification Percentage (%) |
|---|---|---|---|
|  | 7 | 0 | 75 |
| La | 8 | 1 | 78 |
|  | 10.5 | 3.5 | 81 |
|  | 14 | 7 | 78 |
|  | 20 | 13 | 76 |
|  | 27 | 20 | 71 |
| Y | 8 | 1 | 78 |
|  | 10.5 | 3.5 | 82 |
|  | 14 | 7 | 79 |
|  | 20 | 13 | 77 |
|  | 27 | 20 | 72 |

Ce Content: 7 mol %
Measured at 500° C.

It can be seen from the results in Table 2 that, by adding lanthanum or yttrium to the cerium-zirconium composite oxide, the $NO_x$ purification percentage is improved.

(3) Comparison 1 of $SO_x$ Desorption Rate

Storage-reduction type $NO_x$ purifying catalysts of the present invention and a conventional technique were measured for the $SO_x$ desorption rate as follows.

A cerium-zirconium composite oxide having a composition of $La_{0.07}Ce_{0.07}Zr_{0.84}O_2$ was prepared in the same manner as in (2) above. To 100 parts by mass of the obtained cerium-zirconium composite oxide, 100 parts by mass of γ-alumina, 10 parts by mass of alumina sol and an appropriate amount of ion exchanged water were added and mixed in a ball mill to prepare a slurry containing a cerium-zirconium composite oxide and γ-alumina.

This slurry was wash-coated on a straight flow-type cordierite-made monolith substrate, dried and then subjected to baking at 500° C. for 2 hours in an air atmosphere to form a coat layer of 200 g/L on the monolith substrate.

On this coat layer, 3 g of Pt, 0.3 g of Rh, 0.2 mol of Ba, 0.1 mol of K and 0.1 mol of Li were loaded per liter of the monolith substrate in the same manner as in (2) above to prepare a catalyst sample of storage-reduction type $NO_x$ purifying catalyst of the present invention.

Separately, a cerium-zirconium composite oxide having a composition of $Ce_{0.05}Zr_{0.5}O_2$ was prepared. To 20 parts by mass of the obtained cerium-zirconium composite oxide, 180 parts by mass of γ-alumina, 10 parts by mass of alumina sol and an appropriate amount of ion exchanged water were added and mixed in a ball mill to prepare a slurry containing a cerium-zirconium composite oxide and γ-alumina.

Using this slurry, a coat layer of 200 g/L was formed on a monolith substrate in the same manner as above. On this coat layer, 3 g of Pt, 0.3 g of Rh, 0.2 mol of Ba, 0.1 mol of K and 0.1 mol of Li were loaded to prepare a catalyst sample of storage-reduction type $NO_x$ purifying catalyst of a conventional technique.

Each catalyst sample was disposed in an exhaust gas measuring device. Thereafter, the $NO_x$ storing material was substantially saturated with $SO_x$, exposed to a lean exhaust gas of A/F=20 at 650° C. over 10 minutes and then exposed to a rich exhaust gas of A/F=14 at 650° C. in the same manner as in (1) above and the concentration of $SO_x$ contained in the outlet gas of the catalyst sample was measured. The results obtained are shown in FIG. 2.

Figure 2:
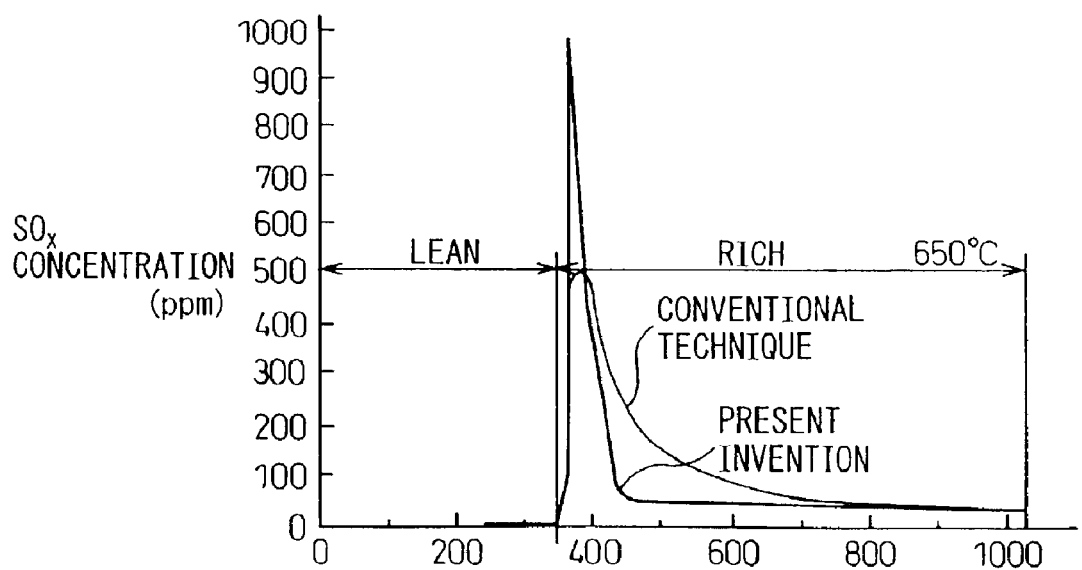
FIG. 2 is a graph showing an example of the $SO_x$ desorption pattern.

As can be seen from the results in FIG. 2, the $SO_2$ desorption rate apparently differs between the storage-reduction type $NO_x$ purifying catalyst of the present invention and the storage-reduction type $NO_x$ purifying catalyst of the conventional technique.

(4) Comparison 1 of $SO_x$ Poisoning Recoverability

Using the same catalyst samples prepared in (3) above, the $NO_x$ storing material was substantially saturated with $SO_x$ and then subjected to an $SO_x$ desorption treatment of exposing the sample to a lean exhaust gas of A/F=20 at 650° C. over 10 minutes and then to a rich exhaust gas of A/F=14 at 650° C. over 10 minutes.

Thereafter, a lean exhaust gas of A/F=20 and a rich exhaust gas of A/F=14 each at a temperature of 200 to 600° C. were alternately passed through each catalyst sample. Here, the lean exhaust gas was passed for 1 minute and the rich exhaust gas was passed for 30 seconds. The concentration of $NO_x$ contained in the outlet gas of the catalyst sample was measured and from the measured value, the $NO_x$ storage amount of the catalyst sample with respect to the temperature was determined. The results obtained are shown in FIG. 3 based on the $NO_x$ storage amount (100%) before the $NO_x$ storing material was saturated with $SO_x$.

Figure 3:
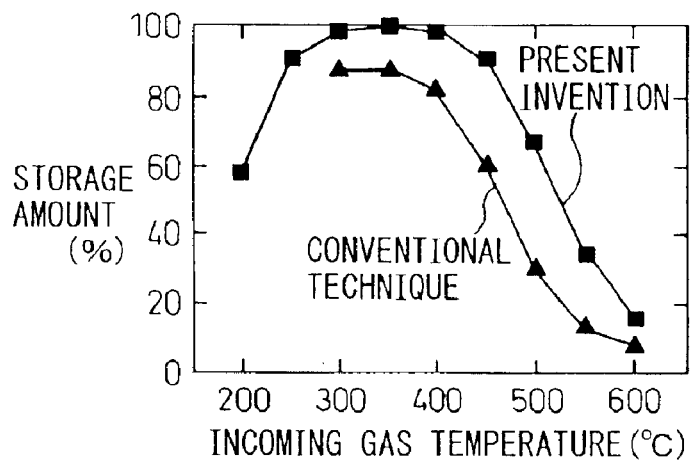
FIG. 3 is a graph comparing the $NO_x$ storing performance after $SO_x$ desorption treatment.

As seen from the results in FIG. 3, the $NO_x$ storage amount after the $SO_x$ desorption treatment is performed apparently differs between the storage-reduction type $NO_x$ purifying catalyst of the present invention and the storage-reduction type $NO_x$ purifying catalyst of the conventional technique, and the storage-reduction type $NO_x$ purifying catalyst of the present invention is high in the recoverability of $NO_x$ storing performance, due to an $SO_x$ desorption treatment, as compared with the conventional technique.

(5) Comparison 2 of $SO_x$ Desorption Rate

Storage-reduction type $NO_x$ purifying catalysts of the present invention and a conventional technique each was measured on the $SO_x$ desorption rate as follows.

In the same manner as in (3) above, a cerium-zirconium composite oxide having a composition of $La_{0.07}Ce_{0.07}Zr_{0.84}O_2$ was prepared and a slurry containing 100 parts by mass of the cerium-zirconium composite oxide and 100 parts by mass of γ-alumina was prepared.

Using this slurry, a coat layer of 200 g/L was formed on a wall flow-type monolith substrate (apparent volume: 35 ml, cell density: about 300 cells/inch$^2$) where the cells were alternately filled.

On this coat layer, 3 g of Pt and 0.3 g of Rh were loaded per liter of the monolith substrate in the same manner as in (2) above and 0.05 mol of K and 0.3 mol Li were further loaded using potassium acetate and lithium acetate, thereby preparing a catalyst sample of the storage-reduction type $NO_x$ purifying catalyst of the present invention.

Separately, a cerium-zirconium composite oxide having a composition of $Ce_{0.5}Zr_{0.5}O_2$ was prepared in the same manner as in (3) above and a slurry containing 20 parts by mass of the cerium-zirconium composite oxide and 180 parts of γ-alumina was prepared.

From this slurry, a coat layer of 200 g was formed on a monolith substrate. On this coat layer, 3 g of Pt and 0.3 g of Rh were loaded, per liter of the monolith substrate, and 0.05 mol of K and 0.3 mol of Li were further loaded using potassium acetate and lithium acetate, thereby preparing a catalyst sample of the storage-reduction type $NO_x$ purifying catalyst of the conventional technique.

Each catalyst sample was disposed in an exhaust gas measuring device. Thereafter, the $NO_x$ storing material was substantially saturated with $SO_x$ in the same manner as in (1) above, the temperature of the catalyst sample was elevated at a rate of 10° C./min while passing a model exhaust gas of A/F=14, and the concentration of $SO_x$ contained in the outlet gas of the catalyst sample was measured. The results obtained are shown in FIG. 4.

Figure 4:
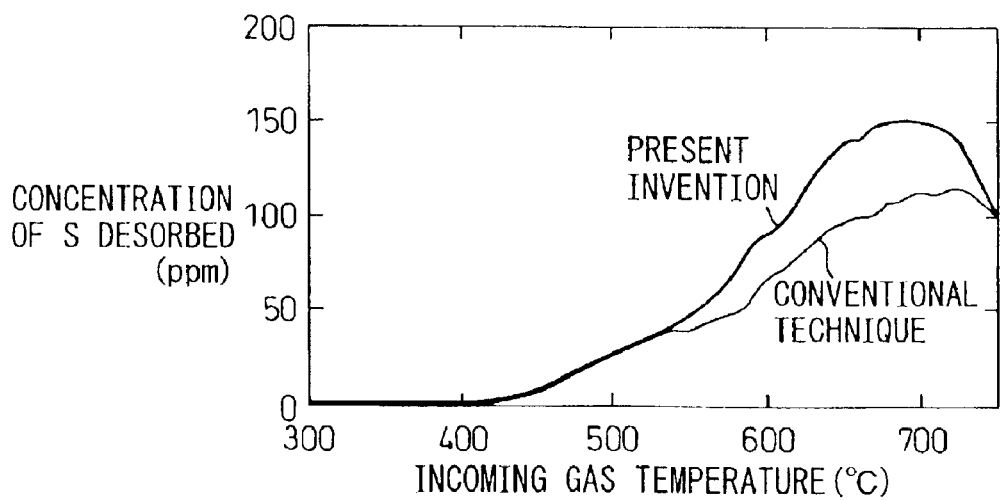
FIG. 4 is a graph showing an example of the $SO_x$ desorption pattern.

As seen from the results in FIG. 4, the $SO_2$ desorption rate apparently differs between the storage-reduction type $NO_x$ purifying catalyst of the present invention and the storage-reduction type $NO_x$ purifying catalyst of the conventional technique.

(6) Comparison 2 of $SO_x$ Poisoning Recoverability

Using the same catalyst samples prepared in (5) above, the $NO_x$ storing material was substantially saturated with $SO_x$ and then subjected to an $SO_x$ desorption treatment by exposing the sample to a rich exhaust gas of A/F=14 at 580° C. over 10 minutes.

Figure 5:
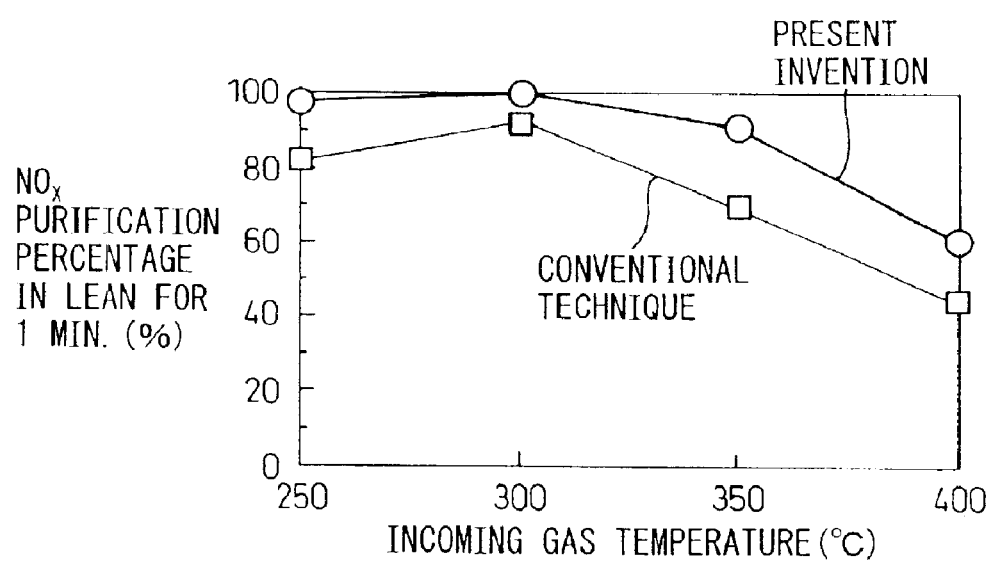
FIG. 5 is a graph comparing the $NO_x$ purification percentage after $SO_x$ desorption treatment.

Thereafter, a lean exhaust gas of A/F=20 and a rich exhaust gas of A/F=14 each at a temperature of 200 to 400° C. were alternately passed through each catalyst sample. Here the lean exhaust gas was passed for 1 minute and the rich exhaust gas was passed for 30 seconds. The concentration of $NO_x$ contained in the outlet gas of the catalyst sample was measured and from the measured value, the $NO_x$ purification percentage in the lean side of the catalyst sample with respect to the temperature was determined. The results obtained are shown in FIG. 5 based on the $NO_x$ purification percentage (100%) before the $NO_x$ storing material was saturated with As seen from the results in FIG. 5, the $NO_x$ purification percentage, after the $SO_x$ desorption treatment is performed, apparently differs between the storage-reduction type $NO_x$ purifying catalyst of the present invention and the storage-reduction type $NO_x$ purifying catalyst of the conventional technique As described in the foregoing pages, according to the present invention, a storage-reduction type $NO_x$ purifying catalyst in which the sulfur poisoning is remarkably reduced and which is capable of stably exerting high $NO_x$ purifying performance can be provided.

What is claimed is:

1. A storage-reduction type $NO_x$ purifying catalyst, comprising:

a monolithic substrate having formed thereon a coat layer containing a cerium-zirconium composite oxide and a cerium-free oxide, a noble metal and a $NO_x$ storing material supported on said coat layer, wherein the cerium content of said cerium-zirconium composite oxide is less than 30 mol %, based on the total molar number of metal atoms contained.

2. The storage-reduction type $NO_x$ purifying catalyst as claimed in claim 1, wherein the cerium content of said cerium-zirconium composite oxide is from 0.1 to 25 mol %, based on the total molar number of metal atoms contained.

3. The storage-reduction type $NO_x$ purifying catalyst as claimed in claim 1, wherein the cerium content of said cerium-zirconium composite oxide is from 0.5 to 10 mol %, based on the total molar number of metal atoms contained.

4. The storage-reduction type $NO_x$ purifying catalyst as claimed in claim 1, wherein said cerium-zirconium composite oxide further comprises at least one metal (M) selected from rare earth metals (excluding cerium).

5. The storage-reduction type $NO_x$ purifying catalyst as claimed in claim 4, wherein said at least one metal (M) selected from rare earth metals is selected from lanthanum, samarium, neodymium, gadolinium and yttrium.

6. The storage-reduction type $NO_x$ purifying catalyst as claimed in claim 4, wherein the M/Ce molar ratio is from 0.1 to 10.

7. The storage-reduction type $NO_x$ purifying catalyst as claimed in claim 4, wherein said cerium-zirconium composite oxide contains (Ce+M) in an amount of 10 to 30 mol %, based on the total molar number of metal atoms contained.

8. The storage-reduction type $NO_x$ purifying catalyst as claimed in claim 1, which comprises a cerium-zirconium composite oxide and a cerium-free oxide at a ratio of 2/8 to 8/2 as a mass ratio of cerium-zirconium composite oxide/cerium-free oxide.

9. The storage-reduction type $NO_x$ purifying catalyst as claimed in claim 1, wherein said cerium-free oxide is selected from the group consisting of alumina, silica, titania, zirconia, silica-alumina, titania-zirconia and zirconia-calcia.

10. The storage-reduction type $NO_x$ purifying catalyst as claimed in claim 1, wherein said $NO_x$ storing material is at least one member selected from the group consisting of Li, Na, K, Rb, Mg, Ca, Sr and Ba.

* * * * *